United States Patent [11] 3,625,479

| [72] | Inventor | George L. Hammon Oakland, Calif. |
| [21] | Appl. No. | 1,729 |
| [22] | Filed | Jan. 9, 1971 |
| [45] | Patented | Dec. 7, 1971 |
| [73] | Assignee | Chemetron Corporation Chicago, Ill. |

[54] TOUCH CONTROL REGULATOR
21 Claims, 4 Drawing Figs.
[52] U.S. Cl. .................................................. 251/288, 137/116.3, 251/297
[51] Int. Cl. ...................................................... F16k 35/04
[50] Field of Search ............................................ 137/116.3, 116.5; 251/288, 297

[56] References Cited
UNITED STATES PATENTS

| 1,319,755 | 10/1919 | Cherry | 251/297 X |
| 2,499,022 | 2/1950 | Franck | 251/297 X |
| 2,566,885 | 9/1951 | Hartley | 251/297 X |
| 2,657,709 | 11/1953 | Gillerstrom et al. | 251/297 X |
| 2,784,934 | 3/1957 | Paulius, Jr. et al. | 251/297 X |
| 2,906,288 | 9/1959 | Young | 251/297 X |
| 3,250,288 | 5/1966 | Hammon | 137/116.3 |

Primary Examiner—Robert G. Nilson
Attorney—Nicholas M. Esser

ABSTRACT: A gas pressure regulator has a touch-responsive knob or cap permitting reasonably accurate intermediate adjustment of the flow rate without reference to calibrated markings.

PATENTED DEC 7 1971 3,625,479
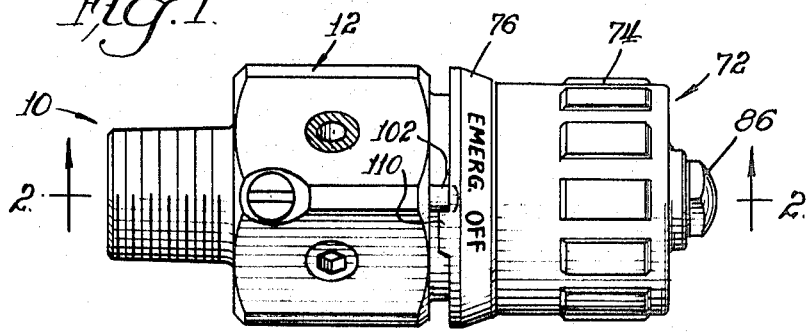
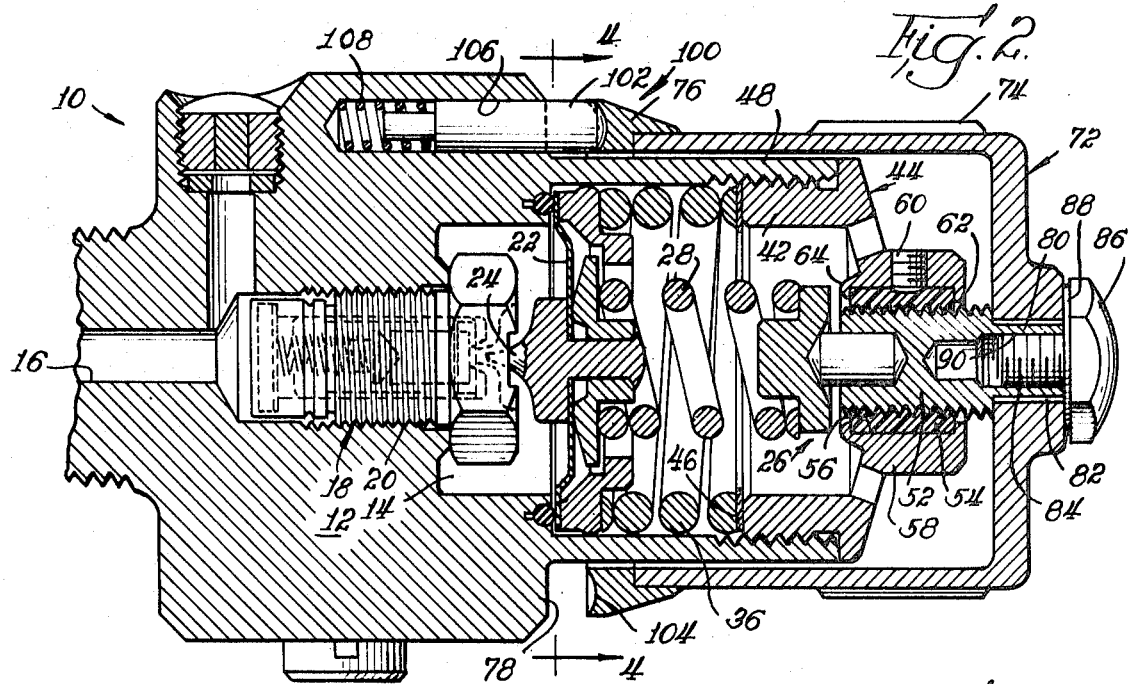
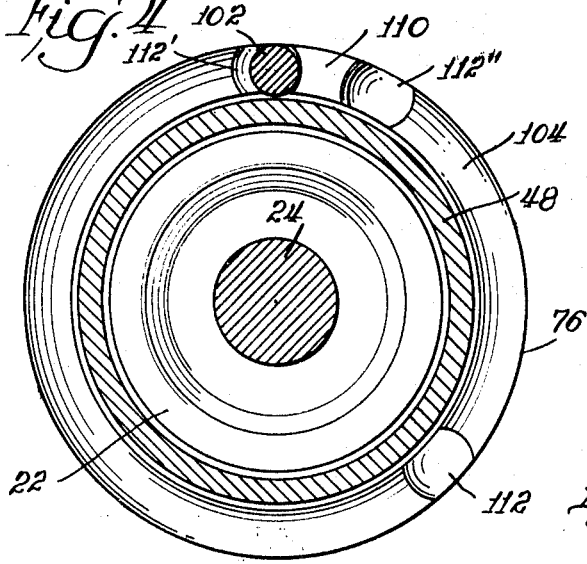
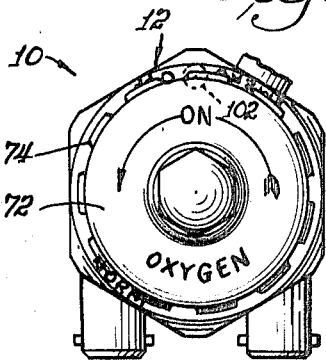
Inventor
George L. Hammon
By *[signature]*
Atty

TOUCH CONTROL REGULATOR

BACKGROUND OF THE INVENTION

This invention pertains generally to gas pressure regulators and more particularly to an improved gas pressure regulator for emergency use.

In a gas pressure regulator of the type disclosed in U.S. Pat. No. 3,250,288, the outlet pressure of the gas is adjusted by means of a control knob or cap to permit the gas to pass through the regulator at a desired flow rate. Typically, with such a regulator, the outlet pressure may be adjusted for adjustment of the flow rate between 0 liters per minute and about 7 liters per minute by movement of the control knob or cap between its full-off and its full-on position. In many instances, for example, to conserve a rapidly diminishing supply of oxygen, it may be desirable or even necessary to make intermediate adjustments of the flow rate. Unless the control knob or cap is properly calibrated and marked, reasonably accurate adjustments of the flow rate can be made only with the aid of a flowmeter or outlet pressure gauge. In an emergency, such as an aircraft emergency involving electrical power failure, a person endeavoring to open such a regulator may not be able to see or read calibrated markings either on the control knob or cap or on a flowmeter or outlet pressure gauge.

Thus, there is a need for an improved gas pressure regulator, of the aforementioned type, permitting reasonably accurate intermediate adjustment of the flow rate to be made without reference to calibrated markings or the like. This invention is addressed to fulfilling such need.

SUMMARY OF THE INVENTION

It is the principal object of this invention to provide an improved gas pressure regulator for emergency use.

It is a more particular object of this invention to provide a gas pressure regulator with which reasonably accurate intermediate adjustments of the flow rate may be made without reference to calibrated markings or the like.

It is another object of this invention to provide a gas pressure regulator having a touch-responsive control knob or cap permitting reasonably accurate intermediate adjustments of the flow rate to be made.

It is yet another object of this invention to provide a gas pressure regulator having a touch-responsive control knob or cap providing positive stops at full-off and full-on positions and further permitting positive location of at least one intermediate position.

The preceding objects may be attained in a gas pressure regulator of the type shown in U.S. Pat. No. 3,250,288. Such a gas pressure regulator is characterized by a combination of means including a normally closed variably openable valve for controlling gas flow into the regulator, a diaphragm, a valve-opening element mounted to the diaphragm and adapted to open the valve upon flexure of the diaphragm, means movable with respect to the diaphragm, and a compression spring arranged to effect flexure of the diaphragm upon movement of the movable means from a full-off position toward a full-on position. The arrangement of such parts is described in detail in the aforementioned patent.

In accordance with the principles of this invention, the gas pressure regulator further comprises means for positively locating the movable means in at least one position intermediate the full-on and full-off positions. Such intermediate position of the movable means corresponds to an intermediate flow rate of gas through the regulator.

Preferably, as in the gas pressure regulator shown in the aforementioned patent, the movable means comprises a threaded element movable along a correspondingly threaded portion of the body of the regulator and a cap external to the body and connected to the threaded element for rotation with the threaded element. Accordingly, the locating means preferably comprises a detent supported by the body and biased against the surface of the cap for engagement with an indentation in such surface upon movement of the threaded element to the desired intermediate position. Likewise, the cap may be connected to the threaded element by a splined connection permitting adjustment of the rotational position of the cap relative to the threaded element.

These and other objects, features and advantages of this invention are evident from the following description, with the aid of the attached drawing, of a preferred embodiment of the invention.

BRIEF DESCRIPTION OF THE DRAWINGS

In the drawings:

FIG. 1 is a plan view of a gas pressure regulator embodying the principles of this invention;

FIG. 2 is a sectional view on an enlarged scale, taken substantially along line 2—2 of FIG. 1 in the direction of the arrows;

FIG. 3 is an elevational view taken from the right side of FIG. 1; and

FIG. 4 is a sectional view taken substantially along line 4—4 of FIG. 2 in the direction of the arrows.

DESCRIPTION OF THE PREFERRED EMBODIMENT

In the drawing, there is shown a gas pressure regulator 10 constituting a preferred embodiment of this invention. The regulator 10, which is of the type shown in U.S. Pat. No. 3,250,288, is designed to supply oxygen or other gas at controlled flow rates and has particular utility in emergency oxygen systems for aircraft and the like.

The regulator 10 is similar to the gas pressure regulator shown in the aforementioned patent in that it generally comprises a suitably fabricated body 12, which has an internal chamber 14 and an inlet 16 and a plurality of outlets (not shown) from the chamber 14, valve means 18 including a normally closed variably operable valve 20 for controlling gas flow from the inlet 16 to the chamber 14, a diaphragm 22 forming a wall of the chamber 14, and a valve-opening element 24 mounted to the diaphragm 22 and adapted to open the valve 20 upon flexure of the diaphragm 22 toward the valve 20 and to permit the valve 20 to be restored upon opposite flexure of the diaphragm 22. Further details of these parts may be had by reference to the aforementioned patent.

The regulator 10 further generally comprises means 26 movable inwardly and outwardly with respect to the diaphragm 22 and a compression spring 28 disposed between the diaphragm 22 and the means 26. Except as noted, the arrangement of the means 26 and the spring 28 is similar to an arrangement of parts in the regulator shown in the aforementioned patent. Thus, the spring 28 is adapted to effect flexure of the diaphragm 22 toward the valve 20 upon inward movement of the means 26 and to permit opposite flexure of the diaphragm 22 upon outward movement of the means 26. The amount by which the means 26 is moved inwardly controls the amount of compression of the spring 28 and thus the amount by which the valve 20 is opened.

As shown, the spring 36 is compressed against the skirt portion 42 of a suitably fabricated cap 44. A washer 46 is disposed between the spring 36 and the cap 44. The skirt portion 42 of the cap 44 fits within and is externally threaded for connection to an internally threaded generally tubular portion 48 of the body 12.

In operation of the regulator 10, as in operation of the regulator shown in the aforementioned patent, a condition of balance is achieved between the pressure of the oxygen or other gas within the chamber 14 and the compression of the spring 28. So long as the gas pressure on the diaphragm 22 is overcome by the compression of the spring 28, the valve 20 remained opened. When the gas pressure on the diaphragm 22 overcomes the compression of the spring 28, the valve 20 is permitted to be restored to its normally closed condition. The flow rate of the oxygen or other gas is determined by the gas pressure within the chamber 14 and by the size of the outlet orifices.

As shown, the means 26 comprises a generally cylindrical threaded element 52 supported by means of a threaded bushing 54 for threaded inward and outward movement. Preferably, the bushing 54 is made of nylon or the like to prevent galling. The bushing 54 is held within a longitudinal bore 56 in a generally cylindrical portion 58 of the cap 44 by means of a setscrew 60. Additionally, a flange 62 on the generally cylindrical portion 58 of the cap 44 holds the bushing 54 at one end of the bore 56, and an extended edge 64 of the generally cylindrical portion 58 of the cap 44 is peened over to hold the bushing 54 at the other end of the bore 56.

The means 26 further comprises a cap 72 external of the body 12 and connected to the threaded element 52 for movement with the threaded element 52. The cap 72 has a knurled skirt portion 74 overlying the generally tubular portion 48 of the body 12. A rim 76 of the cap 72 is spaced from a shoulder 78 of the body 12. A splined axial boss 80 on the threaded element 52 fits within a splined axial bore 82 in the cap 72. A threaded stud 84 having an enlarged head 86 passes through a lockwasher 88 into a threaded axial socket 90 in the boss 80 to hold the cap 72 against the threaded element 52 for conjoint movement of the cap 72 and the threaded element 52. The splined connection permits adjustment of the rotational position of the cap 72 relative to the threaded element 52 for purposes to be described.

The locating means 100 of the present invention, which positively locates the threaded element 52 in a predetermined intermediate position of partial opening of the valve 20, comprises a plunger or detent 102 supported by the body 12 and biased against the adjacent surface 104 of the rim 76 of the cap 72. As shown, the detent 102 is movable within a socket 106 in the shoulder 78 of the body 12, and a helical spring 108 seated within the socket 106 biases the detent 102 outwardly of the socket 106. The detent 102 engages a projection 110 (FIGS. 1 and 4) on the surface 104 to limit rotation of the cap 72 relative to the body 12 both in the direction of opening of the valve 20 and in the direction of closing of the valve 20. The splined connection between the cap 72 and the threaded element 52 permits adjustments of the rotational position of the cap 72 relative to the threaded element 52, as aforementioned, both to insure full closing of the valve 20 at the limiting position in the direction of closing the valve 20 and to effect limited adjustment of the maximum opening of the valve 20 at the limiting position in the direction of opening of the valve 20. The circumferential width of the projection 110 is determined with view of the diameter of the detent 102 to provide a range of opening of the valve 20 corresponding to the desired range of flow rates through the regulator 10, typically, a range of flow rates from 0 liters per minute to about 7 liters per minute. A rounded indentation 112 is formed in the surface 104 for engagement by the detent 102 upon movement of the cap 72 and the threaded element 52 to a predetermined position intermediate the full-off limiting position and the full-on limiting position for partial opening of the valve 20. The detent 102 is rounded, as shown, to facilitate engagement with and disengagement from the indentation 112. The relative positions of the indentation 112 in the surface 104 and of the projection 110 on the surface 104 are determined to positively locate the cap 72 and the threaded element 52 for a desired intermediate flow rate through the regulator 10, for example, a flow rate of about 4 liters per minute. For most uses of the regulator 10, particularly in aircraft and the like, additional intermediate indentations might unduly complicate operation of the regulator 10. Thus, the provision of a single intermediate indentation 112 is preferred. As shown, additional indentations 112' and 112" respectively, are formed in the surface 104 at the full-off and full-on limiting positions. The respective indentations 112, 112' and 112" cooperate with the detent 102 to prevent the cap 72 from being accidentally rotated by vibration of the regulator 10.

The regulator 10 may be used to particular advantage in a sudden emergency, such as an aircraft emergency involving electrical power failure, in which a person seeking to open the regulator 10 may not be able to read calibrated markings. The cap 72 is touch responsive. Engagement of the projection 110 by the detent 102 positively locates the cap 72 and the threaded element 52 both at the full-off limiting position and at the full-on limiting position. Engagement of the indentation 112 by the detent 102 positively locates the cap 72 and the threaded element 52 at the predetermined intermediate position of partial opening of the valve 20. Thus, reasonably accurate intermediate adjustment of the flow rate through the regulator 10 may be made without reference to calibrated markings or the like.

Thus, it will be appreciated that all of the recited objects, advantages and features of this invention have been demonstrated as obtainable in a highly practical apparatus and one that is simple and positive in operation. It will be further understood that although this invention has been described with respect to certain specific embodiments thereof, this invention is not limited thereto, since various modifications of said invention will suggest themselves from the aforesaid description and are intended to be encompassed within the scope of the appended claims wherein there is claimed:

1. In a gas pressure regulator including a body having an inlet and an outlet and regulating means including a valve for regulating gas flow from said inlet to said outlet, the combination comprising: threaded means supported for threaded movement inwardly and outwardly of said body to actuate said valve, said threaded means being movable between a position of maximum opening of the valve and a position of minimum opening of the valve; and locating means for positively locating said threaded means in a predetermined intermediate position of partial opening of said valve, said locating means comprising a detent supported by said body for longitudinal movement inwardly and outwardly of said body in the directions of movement of said threaded means, said detent being biased for movement in one of said directions against a surface of said threaded means for engagement with an indentation in said surface upon movement of said threaded means to said intermediate position.

2. The combination of claim 1 wherein said detent is adapted to engage a projection on said surface upon movement of said threaded means to one of said limiting positions.

3. The combination of claim 2 wherein said detent is adapted to engage said projection upon movement of said threaded means to either limiting position.

4. The combination of claim 1 wherein said threaded means comprises a threaded element supported for threaded movement inwardly and outwardly of said body and a cap external of said body and connected to said threaded element for rotational movement with said threaded element.

5. The combination of claim 4 wherein said surface is a surface of said cap and said detent is biased against said surface for engagement with said indentation upon movement of said threaded means to said intermediate position.

6. The combination of claim 5 wherein said detent is adapted to engage a projection on said of said cap surface upon movement of said threaded means to one of said maximum and minimum opening positions.

7. The combination of claim 6 wherein said detent is adapted to engage said projection upon movement of said threaded means to either of said maximum and minimum opening positions.

8. The combination of claim 4 wherein said cap is connected to said threaded element for threaded movement with said threaded element inwardly and outwardly of said body at a splined connection permitting adjustment of the rotational position of said cap relative to said threaded element.

9. The combination of claim 8 wherein said locating means comprises a detent supported by said body and biased against a surface of said cap for engagement with an indentation in said surface upon movement of said threaded means to said intermediate position.

10. The combination of claim 8 wherein said detent is adapted to engage a projection on said surface upon movement of said threaded means to one of said maximum and minimum opening positions.

11. The combination of claim 10 wherein said detent is adapted to engage said projection upon movement of said threaded means to either of said maximum and minimum opening positions.

12. The combination of claim 5 wherein said detent is adapted to engage an indentation in said surface upon movement of said threaded means to one of said maximum and minimum opening positions.

13. The combination of claim 12 wherein said detent is adapted to engage an indentation in said surface upon movement of said threaded means to either of said maximum and minimum opening positions.

14. The combination of claim 13 wherein said detent is adapted also to engage a projection on said surface upon movement of said threaded means to either of said maximum and minimum opening positions.

15. The combination of claim 1 wherein said detent is biased outwardly of said body.

16. The combination of claim 5 wherein said detent is biased outwardly of said body.

17. The combination of claim 8 wherein said cap is connected to said threaded element by means holding said cap against said threaded element for conjoint movement of said cap and said threaded element.

18. The combination of claim 17 wherein a splined boss on said threaded element fits within a splined bore in said cap.

19. The combination of claim 18 wherein said holding means comprises a threaded stud having an enlarged head external of said cap and passing into a threaded socket in said boss.

20. The combination of claim 9 wherein said detent is supported by said body for movement inwardly of said body in the direction of threaded movement of said threaded element inwardly of said body and outwardly of said body in the direction of threaded movement of said threaded element outwardly of said body.

21. The combination of claim 20 wherein said detent is biased outwardly of said body.

UNITED STATES PATENT OFFICE
CERTIFICATE OF CORRECTION

Patent No. 3,625,479      Dated December 7, 1971

Inventor(s) George L. Hammon

It is certified that error appears in the above-identified patent and that said Letters Patent are hereby corrected as shown below:

Column 4, line 57 insert "surface" before "of" and delete "surface" after "cap".

Signed and sealed this 13th day of June 1972

(SEAL)
Attest:

EDWARD M. FLETCHER, JR.
Attesting Officer

ROBERT GOTTSCHALK
Commissioner of Patents